US009437060B2

(12) United States Patent
Jackson et al.

(10) Patent No.: US 9,437,060 B2
(45) Date of Patent: Sep. 6, 2016

(54) INITIATING REMOTE CONTROL USING NEAR FIELD COMMUNICATIONS

(71) Applicants: Daniel Jackson, Valhalla, NY (US); Fred Bargetzi, Upper Saddle River, NJ (US); Philip Kirkpatrick, Dumont, NJ (US)

(72) Inventors: Daniel Jackson, Valhalla, NY (US); Fred Bargetzi, Upper Saddle River, NJ (US); Philip Kirkpatrick, Dumont, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 104 days.

(21) Appl. No.: 13/966,124

(22) Filed: Aug. 13, 2013

(65) Prior Publication Data

US 2015/0048924 A1 Feb. 19, 2015

Related U.S. Application Data

(60) Provisional application No. 61/682,624, filed on Aug. 13, 2012.

(51) Int. Cl.

| | |
|---|---|
| ***G05B 19/00*** | (2006.01) |
| ***G05B 23/00*** | (2006.01) |
| ***G06F 7/00*** | (2006.01) |
| ***G06F 7/04*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |
| ***G07C 9/00*** | (2006.01) |

(52) U.S. Cl.
CPC .................................. *G07C 9/00103* (2013.01)

(58) Field of Classification Search
CPC .......... G07C 9/00111; G07C 9/00039; G07C 9/00182; G08C 19/28; G08C 2201/21; G08C 17/02; G08C 2201/31
USPC ......... 340/5.51, 5.81, 5.6, 10.52, 12.4, 1.22, 340/12.54, 12.26; 362/276, 233, 466, 529; 315/32, 80, 149, 154, 383; 345/156, 345/168, 173, 169, 170, 172, 504, 505, 531, 345/538; 341/22; 455/39; 709/208, 209, 709/211; 700/3
See application file for complete search history.

(56) References Cited

U.S. PATENT DOCUMENTS

| | | | | |
|---|---|---|---|---|
| 7,705,829 | B1 * | 4/2010 | Plotnikov | G06F 3/0236 341/22 |
| 7,952,467 | B2 * | 5/2011 | Hardacker | G08C 17/02 340/12.22 |
| 8,215,546 | B2 | 7/2012 | Lin | |
| 8,498,572 | B1 * | 7/2013 | Schooley | H04B 5/0031 340/10.51 |
| 2009/0033627 | A1 * | 2/2009 | Aasen | G06F 3/0221 345/168 |
| 2009/0079696 | A1 * | 3/2009 | Shin | G06F 3/04886 345/169 |
| 2010/0052901 | A1 | 3/2010 | Szucs | |
| 2010/0141153 | A1 * | 6/2010 | Recker et al. | 315/149 |
| 2012/0188052 | A1 | 7/2012 | Rosenblatt | |
| 2013/0201098 | A1 * | 8/2013 | Schilit | H04L 12/282 345/156 |

* cited by examiner

*Primary Examiner* — George Bugg
*Assistant Examiner* — Anthony D Afrifa-Kyei

(57) ABSTRACT

A system in which a portable electronic device communicates with a keypad including a near field communication (NFC) tag in order to establish remote control of a controllable residential device over a home automation network. Upon placing the portable electronic device near the keypad, a control application running on the portable electronic device is launched and a graphical representation of the keypad is displayed on the portable electronic device. The portable electronic device then provides remote control of the controllable residential device over the home automation network. The portable electronic device may additionally provide expanded control options for the controllable residential device.

19 Claims, 12 Drawing Sheets

INITIATING REMOTE CONTROL USING NEAR FIELD COMMUNICATIONS

BACKGROUND OF THE INVENTION

1. Technical Field

The present invention relates to home automation networks, controllable residential devices, and keypads and more specifically to systems where control points communicate with portable electronic devices, such as smart phones, using near field communication (NFC) standards.

2. Background Art

The ever-expanding reach of smart portable devices has extended to building automation. Smart phones and tablets are increasingly providing convenient and varied control options for residential and commercial buildings. Where there was once a myriad of remote controls or no remote control at all, there is now a single smart phone running an "app", such as a control application.

A couple such control applications are Crestron Mobile Pro® or Crestron Mobile® available from Crestron Electronics, Inc. of Rockleigh, N.J. With a control application, such as Crestron Mobile Pro®, a user may access a home automation network thereby allowing for control of the various devices and control elements incorporated in the home automation network from a smart mobile device. For example, a user may now load a control application on his smart phone to turn off a bedroom light from a remote location such as another room in the home or in his office.

While the introduction of smart portable devices to home automation has had a noticeable positive impact, existing systems do not fully leverage the capabilities of current generation smart phones and tablets. One such capability is near field communication (NFC).

NFC is a set of standards for short-range wireless communication technology that employs magnetic field induction to enable communication between electronic devices in close proximity. The technology allows an NFC-enabled device to communicate with another NFC-enabled device or to retrieve information from an NFC tag. This enables users to perform intuitive, safe, contactless transactions, access digital content and connect electronic devices simply by touching or bringing devices into close proximity.

NFC operates in the standard unlicensed 13.56 MHz frequency band over a range of around 2-4 cm and offers data rates in the range of at least 106 kbits/s to 424 kbit/s. NFC standards cover communication protocols and data exchange formats and are based on existing radio frequency identification (RFID) standards. The standards include ISO/IEC 18092 and those defined by the NFC Forum, a non-profit industry organization which promotes NFC and certifies device compliance.

There are two modes of operation covered by the NFC standards: (i) active mode and (ii) passive mode. In active mode, both communicating devices are capable of transmitting data. Each device alternately generates and deactivates their own electromagnetic field to transmit and receive data.

In passive mode, only one device, the "initiator" device, generates an electromagnetic field, while other "target" device, typically an NFC tag, modulates the electromagnetic field to transfer data. The NFC protocol specifies that the initiating device is responsible for generating the electromagnetic field. In this passive mode, the target device may draw its operating power from the initiator-provided electromagnetic field.

There is now a need to fully leverage the near field communication (NFC) capabilities of smart portable devices, such as smart phones and tablets, to provide more robust control systems.

SUMMARY OF THE INVENTION

It is to be understood that both the general and detailed descriptions that follow are exemplary and explanatory only and are not restrictive of the invention.

DISCLOSURE OF INVENTION

Principles of the invention include devices, systems and methods for facilitating control of a device with a portable electronic device via near field communication.

According to a first aspect, the present invention provides a system for controlling a lighting load on a home automation control network comprising (a) a keypad configured for receiving user inputs for controlling the lighting load, (b) a portable electronic device comprising an NFC interface, a wireless network interface, a display, a memory encoding one or more processor-executable instructions and a processor configured to load the one or more processor-executable instructions, and (c) wherein the home automation network is configured for executing control signals for the lighting load in accordance with predefined user preferences associated with the user ID. The keypad further comprises (i) an NFC tag encoding a network address of the keypad and an application identifier, and (ii) a button assembly comprising one or more buttons having a button configuration defining a number and arrangements of the one or more buttons and a button functionality defining a control function of each of the one or more buttons. The one or more processor-executable instructions, when executed by the processor, cause acts to be performed comprising (i) reading the network address of the keypad and an application identifier encoded on the NFC tag via the NFC interface of the portable electronic device, (ii) opening a control application associated with the application identifier configured for communicating with the home automation control network, (iii) transmitting the network address of the keypad and a user ID associated with the portable electronic device to the home automation network via the wireless network interface, (iv) displaying on the display a menu page of the control application comprising one or more selectable visual items representing one or more buttons of the keypad as a graphical representation of the one or more buttons having the same button configuration and button functionality of the one or more keys of the keypad, (v) receiving one or more inputs that correspond to actuating one or more buttons of the keypad, and (vi) transmitting a control signal to the home automation control network via the wireless network interface in response to a selection of one of the one or more selectable visual items.

According to a second aspect, the present invention provides a system comprising (a) a controllable residential device, (b) a home automation network, and (c) a keypad configured for receiving user inputs for controlling the controllable residential device, and (d) a portable electronic device comprising an NFC interface, a wireless network interface, a display, a memory encoding one or more processor-executable instructions, and a processor configured to load the one or more processor-executable instructions. The keypad further comprises (i) an NFC tag encoding a tag ID, an application identifier, a project file ID, a control processor ID, and information detailing one or more physical characteristics of the keypad and (ii) a button assembly comprising one or more buttons having a button configuration defining a number and arrangement of the one or more buttons and a button functionality defining a control function of each of the one or more buttons. The processor-executable instructions, when executed by the processor, cause acts to be performed, comprising (i) reading the tag ID, the application identifier, the project file ID, the control processor ID and the information detailing one or more physical characteristics of the keypad encoded on the NFC tag via the NFC interface of the portable electronic device, (ii) opening a control application associated with the application identifier, the control application configured for communicating on the home automation network, (iii) transmitting the network address of the keypad and a user ID associated with the portable electronic device to the home automation network via the wireless network interface, (iv) generating a graphic facsimile of the keypad according to the information detailing one or more physical characteristics of the keypad, the graphic facsimile comprising one or more selectable visual items representing one or more buttons of the keypad, (v) displaying on the display a generated menu page comprising the graphical facsimile of the of keypad, (vi) executing control signals for the controllable residential device in accordance with predefined user preferences associated with the user ID, (vii) receiving one or more inputs to the generated menu page that correspond to actuating one or more buttons of the keypad, (viii) logging the one or more inputs to the generated menu page as logged button actuations, (ix) loading a stored project file of the home automation control network corresponding to the project file ID encoded on the NFC tag, (x) associating the one or more logged button actuations with one or more control functions of the keypad, and (xi) transmitting one or more control signals corresponding to the associated control functions via the wireless network interface to a control processor associated with the control processor ID encoded on the NFC tag.

The present invention seeks to overcome or at least ameliorate one or more of several problems, including but not limited to: providing a simple method for enabling control of a device with a portable electronic device.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWING

Figure 1:
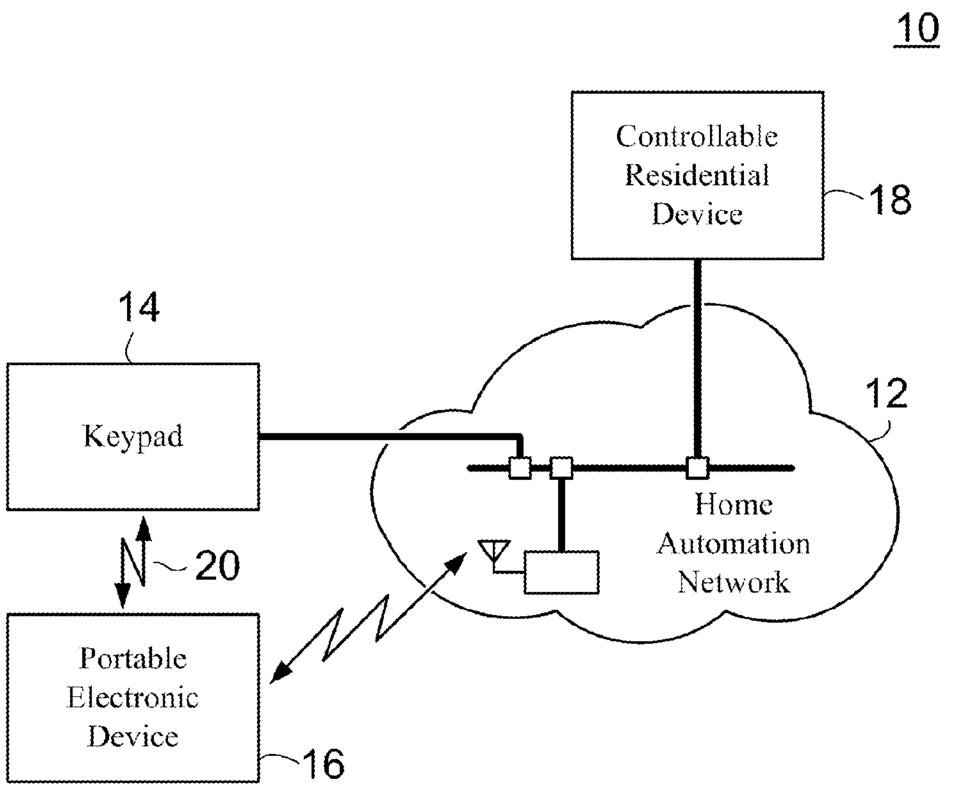

FIG. 1 illustrates a system for controlling a controllable residential device on a home automation network, according to an illustrative embodiment of the invention.

Figure 2:
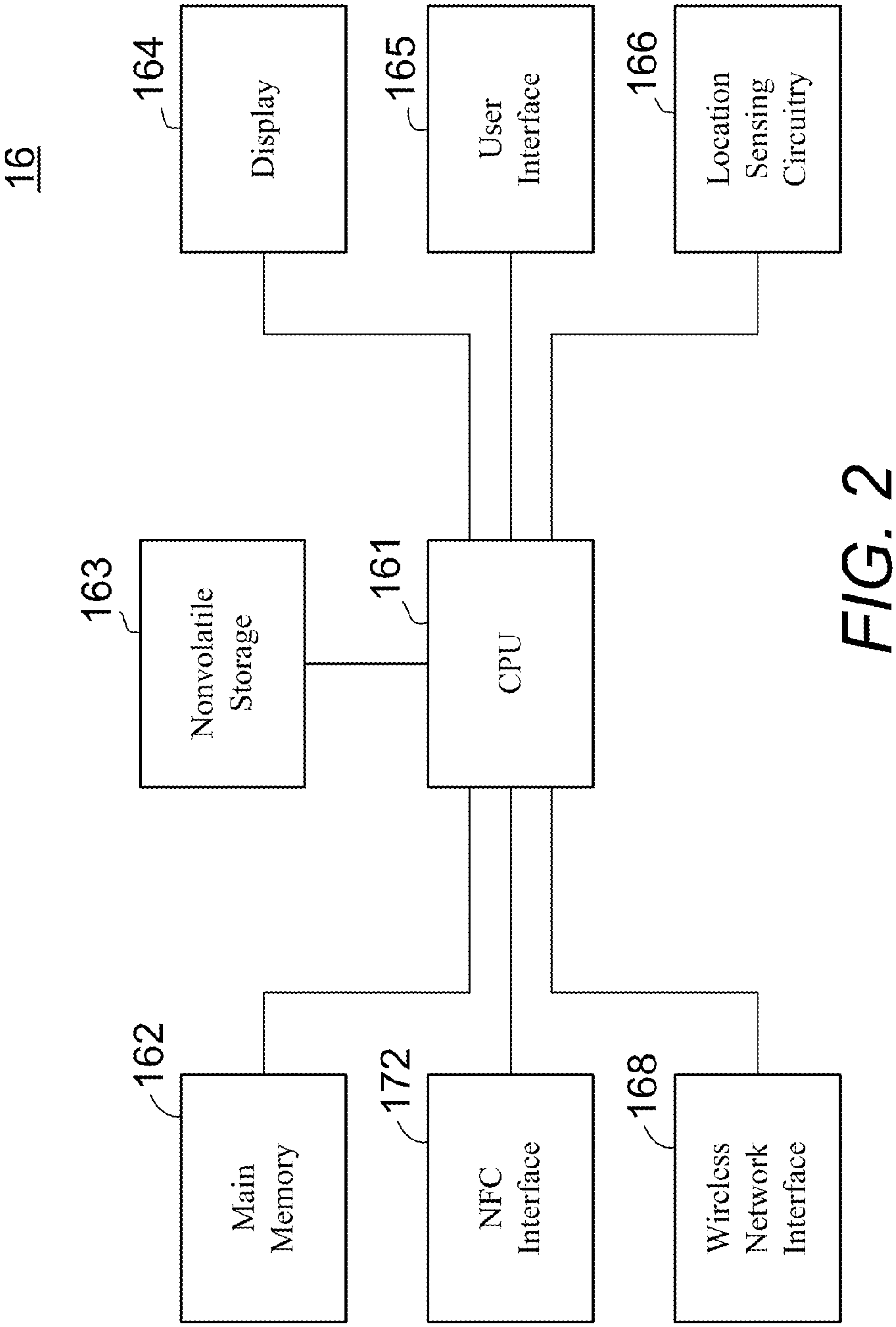

FIG. 2 is a block diagram depicting the portable electrical device of FIG. 1, according to an illustrative embodiment of the invention.

Figure 3:
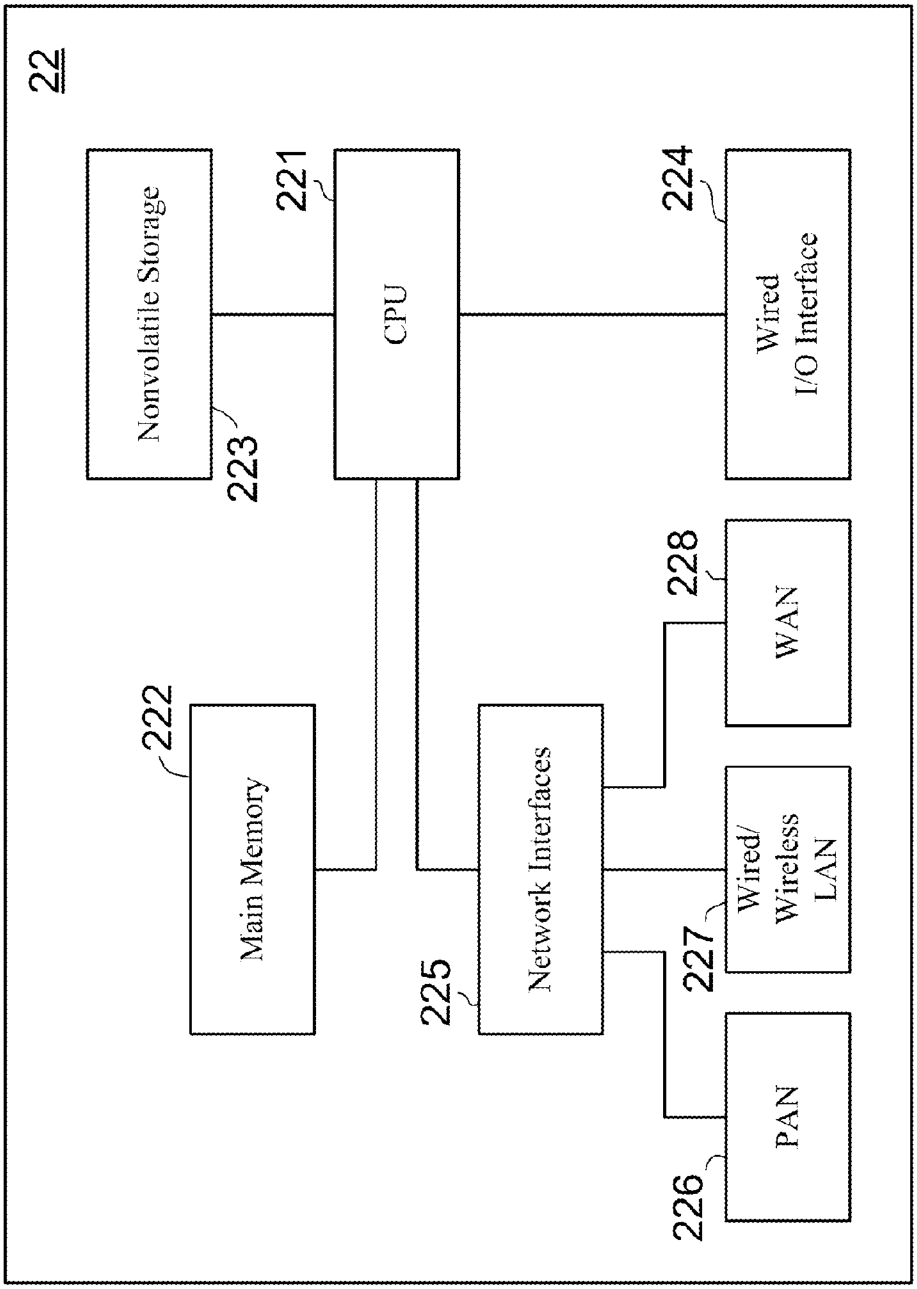

FIG. 3 is a block diagram depicting a control processor, according to an illustrative embodiment of the invention.

Figure 4:
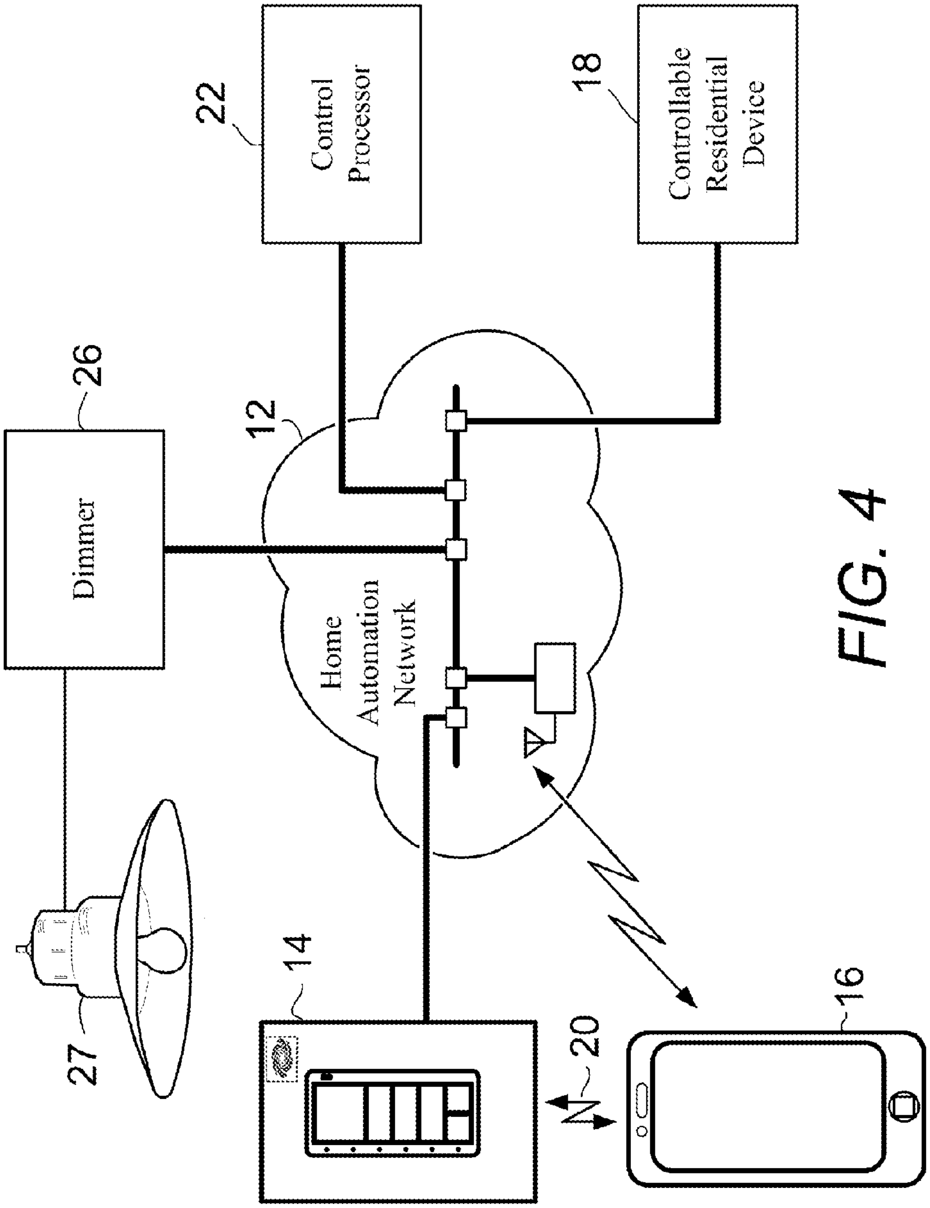

FIG. 4 illustrates an exemplary embodiment of a system for controlling one or more lighting loads, according to an illustrative embodiment of the invention.

Figure 5:
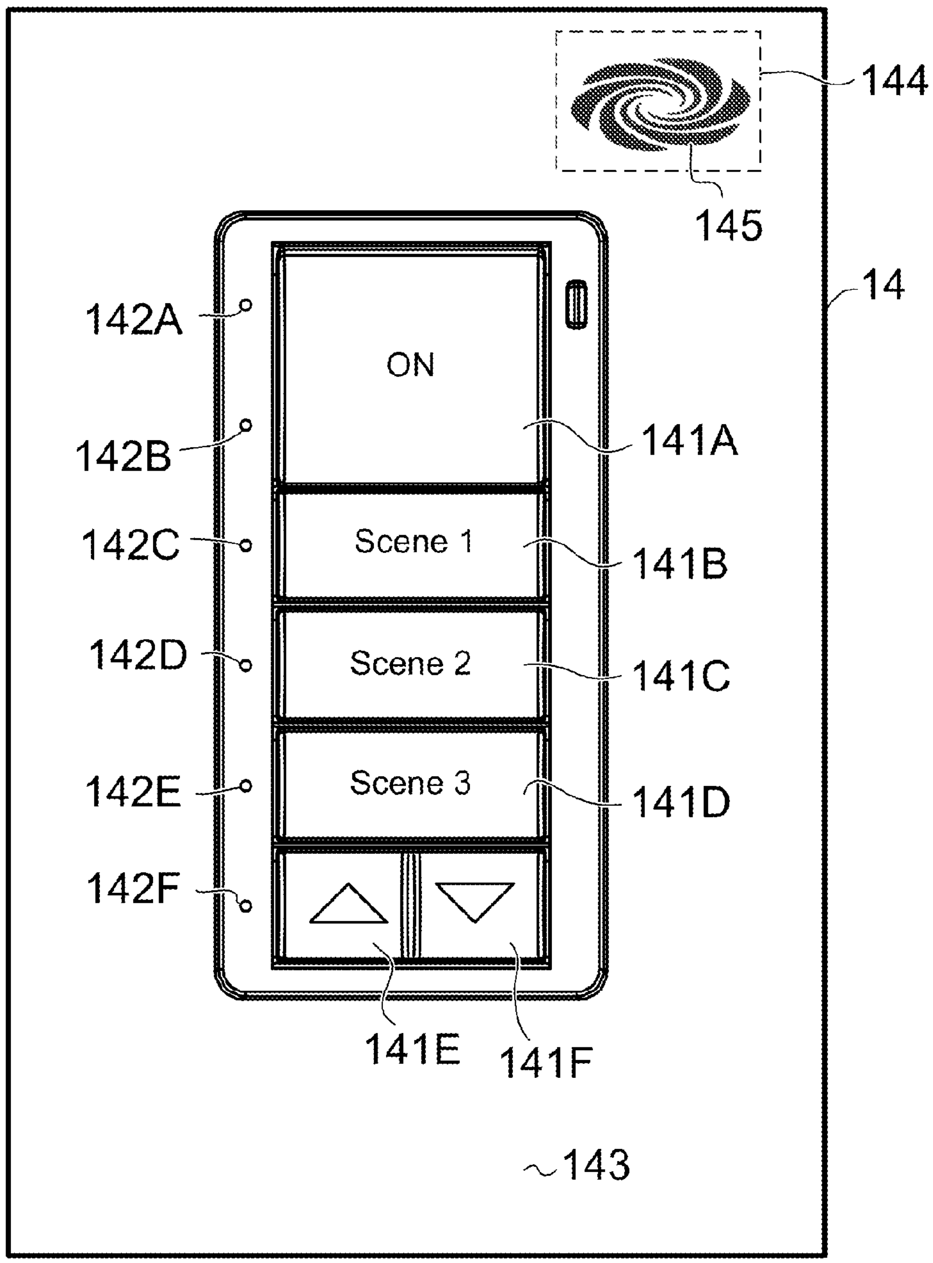

FIG. 5 shows the keypad of FIG. 4, according to an illustrative embodiment of the invention.

Figure 6:
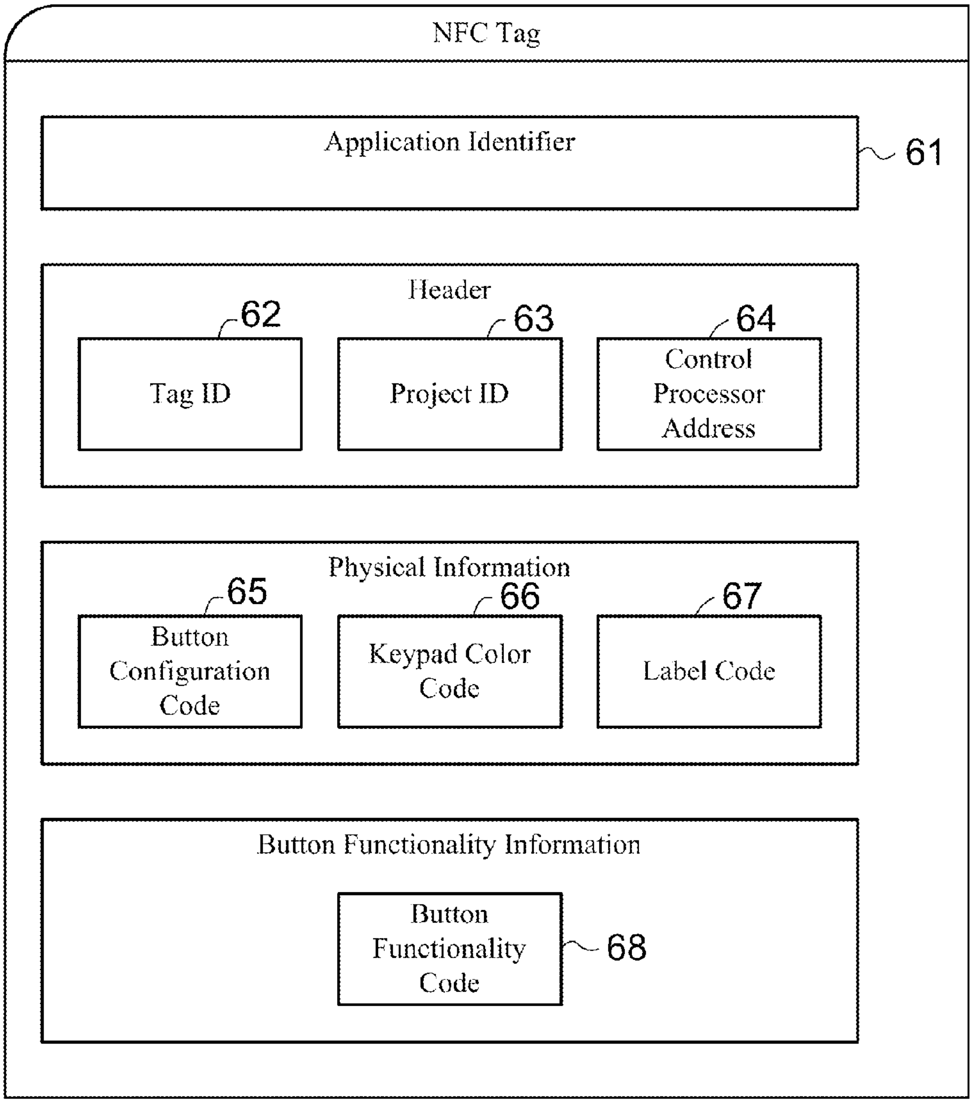

FIG. 6 is a visual representation of an NFC tag, according to an illustrative embodiment of the invention.

Figure 7:
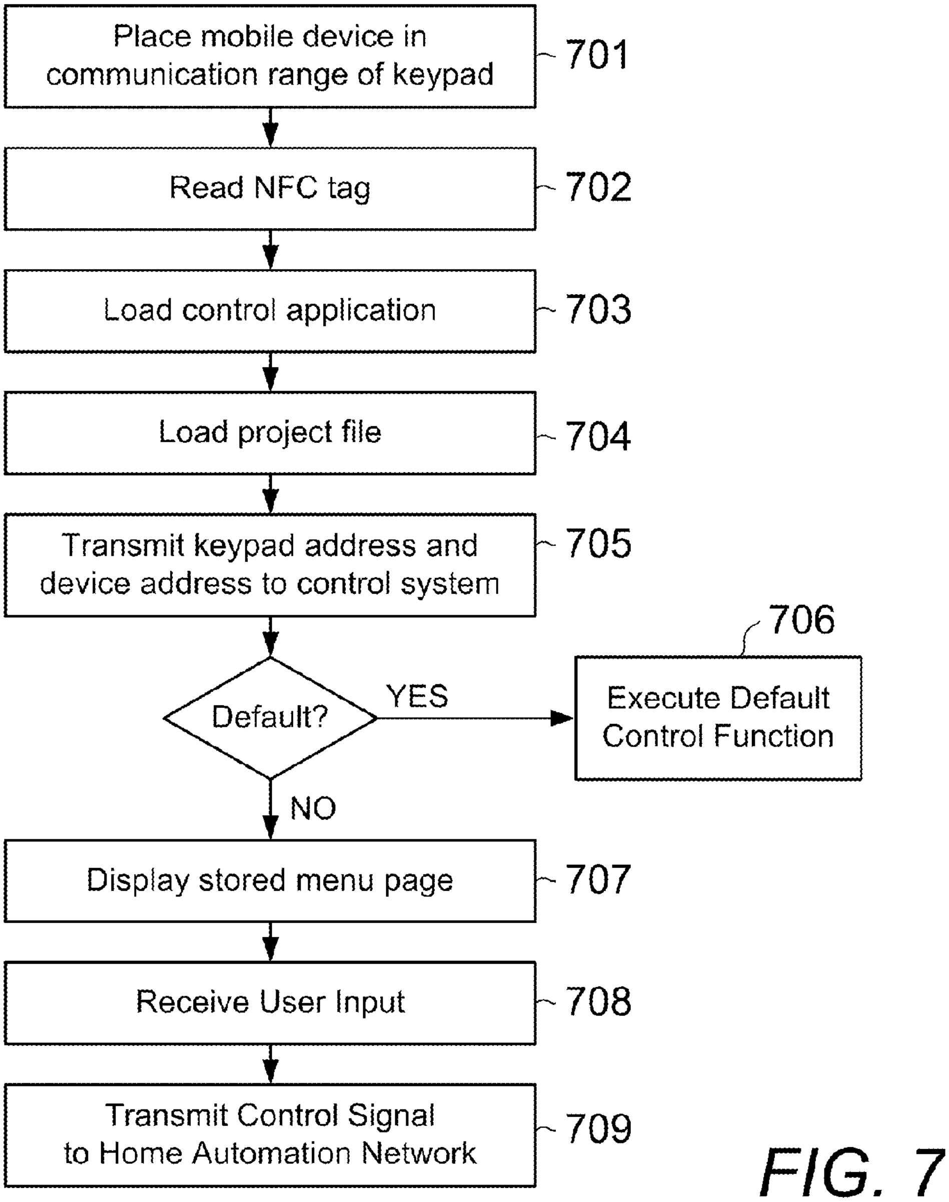

FIG. 7 is a flowchart showing steps for performing a method of controlling a controllable residential device, according to an illustrative embodiment of the invention.

Figure 8:
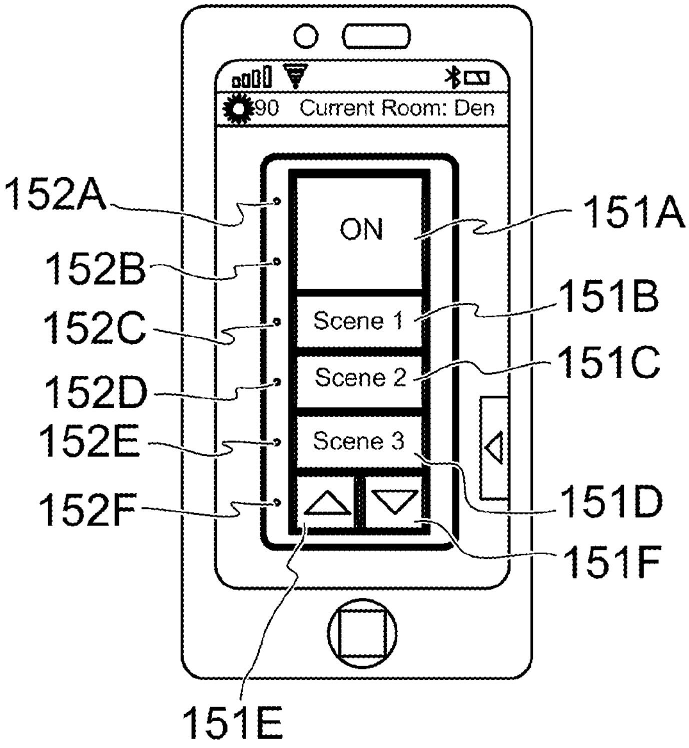

FIG. 8 is a schematic of a screen that may be displayed on the portable electronic device for controlling the controllable residential device, according to an illustrative embodiment of the invention.

Figure 9:
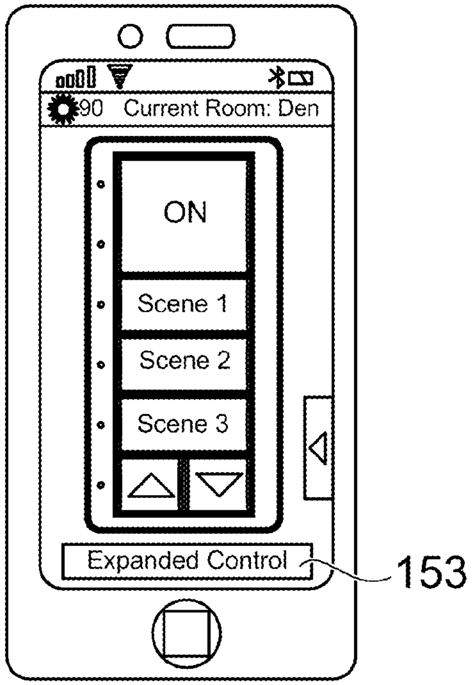

FIG. 9 is a schematic of a screen that may be displayed on the portable electronic device for accessing expanded control options for the controllable residential device, according to an illustrative embodiment of the invention.

Figure 10:
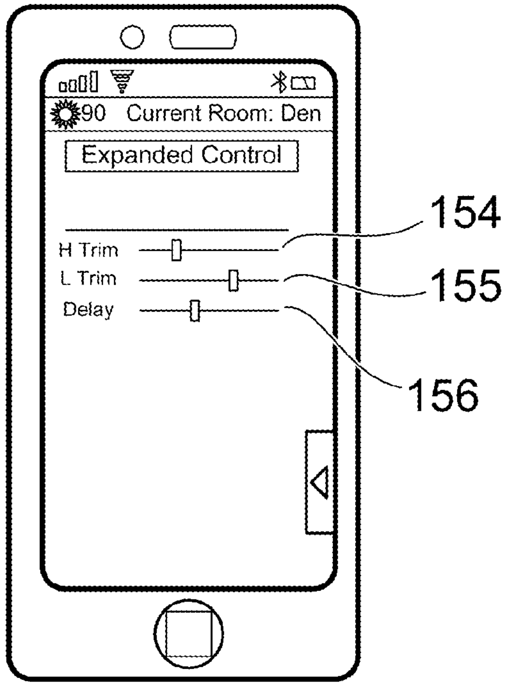

FIG. 10 is a schematic of a screen that may be displayed on the portable electronic device for controlling the controllable residential device with expanded control options, according to an illustrative embodiment of the invention.

Figure 11:
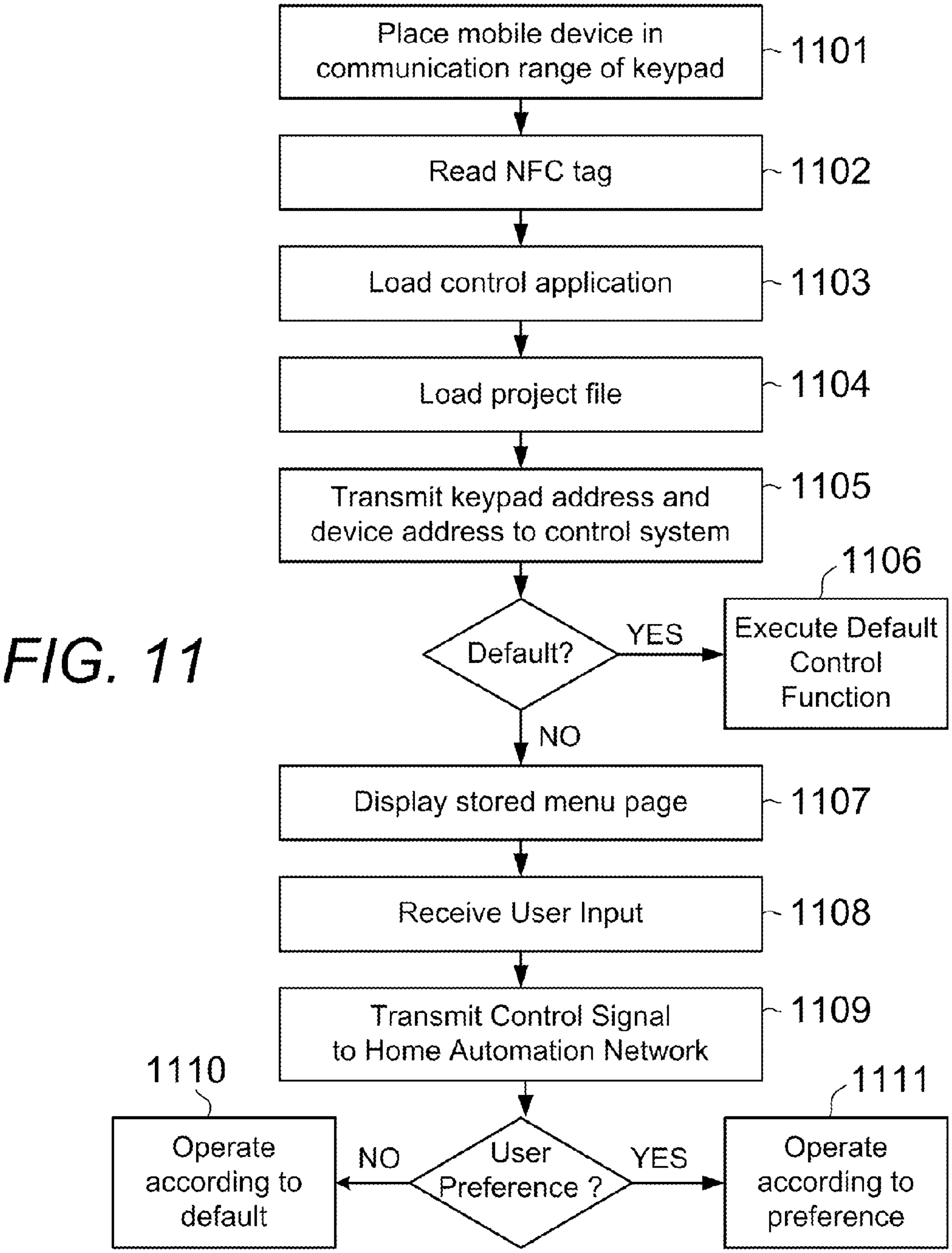

FIG. 11 is a flowchart showing steps for performing a method of controlling a controllable residential device, according to an illustrative embodiment of the invention.

Figure 12:
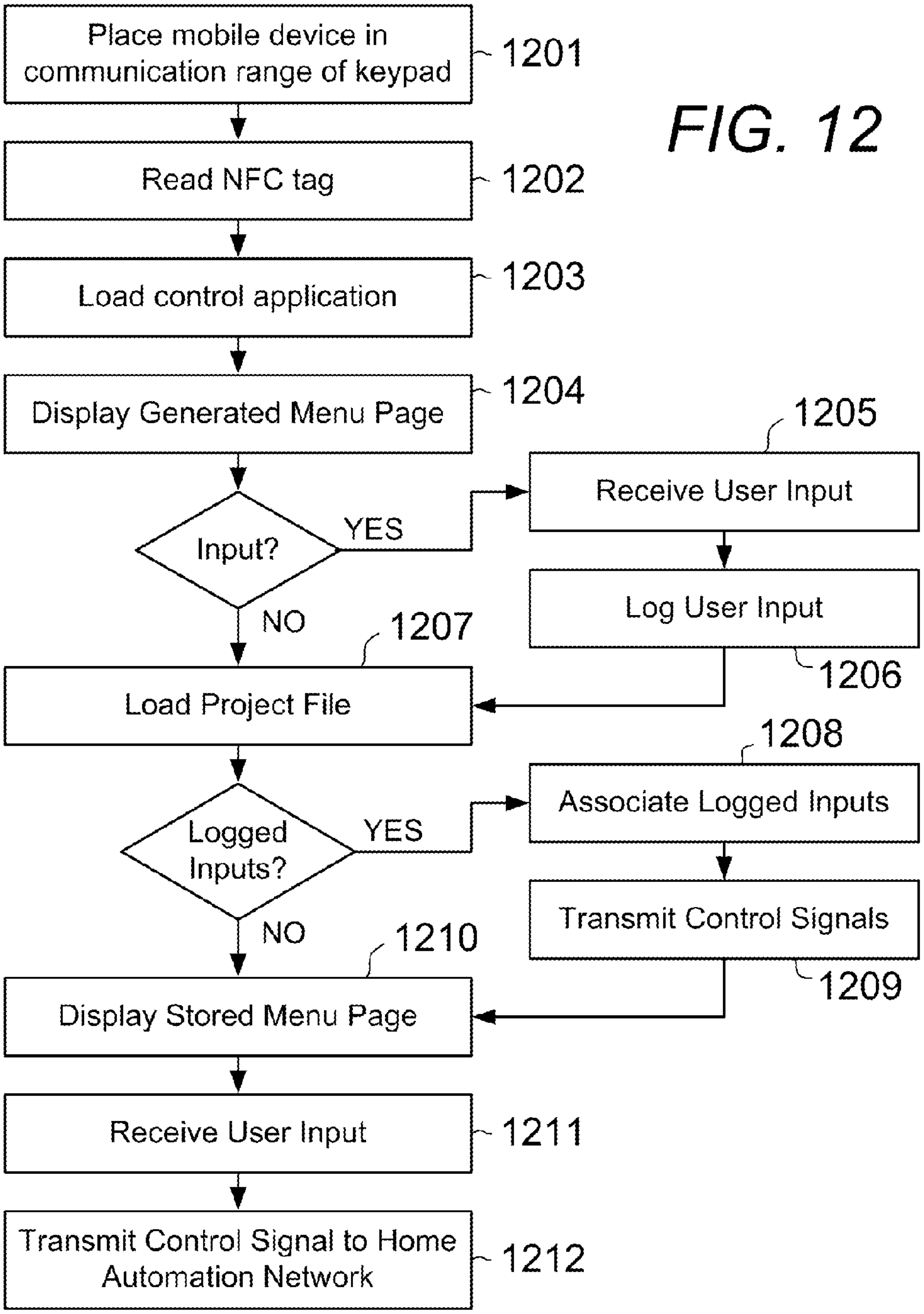

FIG. 12 is a flowchart showing steps for performing a method of controlling a controllable device, according to an additional illustrative embodiment of the invention.

LIST OF REFERENCE NUMBERS FOR THE MAJOR ELEMENTS IN THE DRAWING

The following is a list of the major elements in the drawings in numerical order.

10 system
12 home automation network
14 keypad/physical keypad
16 portable electronic device/smart phone
18 controllable residential device
20 NFC communication channel
22 control processor
26 lighting dimmer
27 controllable lighting load
61 application identifier
62 tag ID
63 project ID
64 control processor ID
65 button configuration code
66 keypad color code
67 label code
68 button functionality code
141A-F buttons
142A-F visual indicators
143 faceplate
144 near field communication tag
145 indicator marking
151A-F button icons
152A-F graphical visual indicators
153 expanded control icon
154 high end trim level selector
155 low end trim level selector
156 delay time selector
161 central processing unit (p/o portable electronic device 16)
162 main memory (p/o portable electronic device 16)
163 nonvolatile storage (p/o portable electronic device 16)
164 display (p/o portable electronic device 16)
165 user interface (p/o portable electronic device 16)

166 location-sensing circuitry (p/o portable electronic device 16)
168 wireless network interface (p/o portable electronic device 16)
172 near field communication interface (p/o portable electronic device 16)
221 central processing unit (p/o control processor 22)
222 main memory (p/o control processor 22)
223 nonvolatile storage (p/o control processor 22)
224 wired I/O interface (p/o control processor 22)
225 network interfaces (p/o control processor 22)
226 personal area network interface (p/o control processor 22)
227 local area network interface, wired/wireless (p/o control processor 22)
228 wide area network interface (p/o control processor 22)
701 (step of) positioning the portable electronic device
702 (step of) reading encoded information from NFC tag
703 (step of) loading control application on portable electronic device
704 (step of) loading project file on control application
705 (step of) transmitting keypad address and portable electronic device address to control system
706 (step of) executing default action
707 (step of) displaying stored menu page with graphic representation of keypad
708 (step of) receiving user input
709 (step of) transmitting control signals to control network
1101 (step of) positioning the portable electronic device
1102 (step of) reading encoded information from NFC tag
1103 (step of) loading control application on portable electronic device
1104 (step of) loading project file on control application
1105 (step of) transmitting keypad address and portable electronic device address to control system
1106 (step of) executing default action
1107 (step of) displaying stored menu page with graphic representation of keypad
1108 (step of) receiving user input
1109 (step of) transmitting control signals to control network
1110 (step of) operating according to default settings
1111 (step of) operating according to user preferences
1201 (step of) positioning the portable electronic device
1202 (step of) reading encoded information from NFC tag
1203 (step of) loading control application on portable electronic device
1204 (step of) displaying a generated menu page
1205 (step of) receiving user input to generated menu page
1206 (step of) logging user inputs to generated menu page
1207 (step of) loading the project file
1208 (step of) associating the logged user inputs to a keypad
1209 (step of) transmitting control signals
1210 (step of) displaying the stored menu page of the project file
1211 (step of) receiving one or more user inputs to the stored menu page
1212 (step of) transmitting one or more control signals to the control processor

DETAILED DESCRIPTION OF THE INVENTION

The present invention is generally implemented as a system and method for controlling a controllable device, such as lighting devices, audio-video (A/V) devices, heating ventilation and air conditioning (HVAC) devices, security devices, and sensor devices with a portable electronic device, such as a smart phone or tablet. The present invention allows a user to initiate control access through near field communication (NFC) between a portable electronic device and a keypad for the controllable device. NFC technology is leveraged to allow users to trigger actions by placing an NFC-enabled portable electronic device (i.e. NFC initiator device) near NFC tags. These can include actions performed locally at the portable electronic device, such as opening a control application and displaying a control menu, or by a home automation network, such as by executing predefined control routines. NFC technology also facilitates the use of presence information by indicating who a user is, where he is and with which device he is interacting, thereby opening up a wide array of options in personalized control not previously feasible.

Upon placing a portable electronic device, such as a NFC-enabled smartphone, within range of the keypad, the portable electronic device displays a menu page of a control application functioning as a graphic user interface for controlling the device or devices associated with the keypad. For example, upon placing the portable electronic device within range of a keypad, a menu page comprising a graphic representation of the keypad may be displayed on the portable electronic device. The graphic representation may be a graphic facsimile of the keypad intended to substantially approximate the look of the keypad so as to present a familiar interface to the user.

While the present invention is described in embodiments herein in the context of a residential (or commercial) lighting control system incorporating one or more lighting control devices, a keypad and a smart mobile phone, it is not limited thereto, except as may be set forth expressly in the appended claims. The present invention is suited for providing control access to various devices, located in a typical residence, controlled through a keypad, such as audio-video (A/V) devices, heating, ventilation, and air-conditioning (HVAC) devices, security devices, household appliances, sensor devices and other similar devices found in commercial and residential structures.

FIG. 1 illustrates an exemplary embodiment of a system for controlling a controllable residential device, according to an illustrative embodiment of the invention. It should be noted that the exemplary embodiment of the system illustrated in FIG. 1 may be varied in one or more aspects without departing from the spirit and scope of the teachings disclosed herein.

The system 10 comprises the following elements: a keypad 14, a portable electronic device 16 and the home automation network 12. It should be noted that while the keypad 14 and portable electronic device are depicted in FIG. 1 as being distinct from the home automation network, this is done for illustrative purposes. Each device communicates on the home automation network and may be considered, along with the home automation network, as components of a more expansive control system.

The keypad 14 provides control access to a controllable residential device. The keypad 14 controls the controllable residential device via a home automation network, such as wired serial digital (e.g. Cresnet) network and a control processor 22.

One or more control functions for controlling the controllable residential device are associated with the keypad 14. The one or more control functions are selected by a user via a user interface. The keypad 14 receives the user input corresponding to one or more control functions via the user interface and transmits a control signal to the home automation network. The keypad 14 may receive feedback from the home automation network.

For example, the keypad 14 may be a keypad for controlling a lighting dimmer regulating the energy supplied to one or more lighting loads. The control functions of the keypad may be turning the light on, turning the light off, raising or lowering the intensity of the light or setting the intensity of the light at a predefined set point. The user may select a control function of the keypad by actuating one or more buttons of the keypad. Upon receiving the user input, the keypad transmits a corresponding control signal to the home automation network.

The keypad 14 further comprises a near field communication (NFC) tag. The NFC tag encodes a tag identification (tag ID) of the keypad, an application identifier, an ID of the target control network (i.e. home automation network 12), such as a control processor ID, and a project file ID. In an embodiment of the invention, the tag ID of the keypad 14 is a network address of the keypad 14. In an embodiment of the invention, the NFC tag is configured for being read, via a NFC communication channel 20, by an NFC interface, within the portable electronic device 16, in a passive communication mode. In this mode, the NFC tag draws its operating power from the electromagnetic field provided by the NFC interface of the initiator device, portable electronic device 16. Advantageously, the NFC tag does not require a power supply for operation.

The portable electronic device 16 may be a smart phone, tablet, personal digital assistant or similar electronic device configured for communicating with a home automation network 12 via a control application as well as communicating via NFC protocols on an NFC communication channel 20. For example, the portable electronic device 16 may be a smart phone running the Crestron Mobile Pro® control application available from Crestron Electronics, Inc. The control application may be downloaded and stored in the portable electronic device from an application marketplace such as the Google Play marketplace or the iTunes marketplace or other similar marketplace.

FIG. 2 is a block diagram depicting the portable electronic device 16, according to an illustrative embodiment of the invention. The portable electronic device 16 may include at least one central processing unit (CPU) 161. For example, the CPU may represent one or more microprocessors, and the microprocessors may be "general purpose" microprocessors, a combination of general and special purpose microprocessors, or application specific integrated circuits (ASICs). Additionally or alternatively, the CPU may include one or more reduced instruction set (RISC) processors, video processors, or related chip sets. The CPU may provide processing capability to execute an operating system, run various applications, and/or provide processing for one or more of the techniques described herein. Applications that may run on the portable electronic device 16 may include, for example, software for controlling other electronic devices via a control network, such as home automation network 12, as noted above.

A main memory 162 may be communicably coupled to the CPU, which may store data and executable code. The main memory may represent volatile memory such as RAM, but may also include nonvolatile memory, such as read-only memory (ROM) or Flash memory. In buffering or caching data related to operations of the CPU, the main memory may store data associated with applications running on the portable electronic device 16.

The portable electronic device 16 may also include nonvolatile storage 163. The nonvolatile storage may represent any suitable nonvolatile storage medium, such as a hard disk drive or nonvolatile memory, such as Flash memory. Being well-suited to long-term storage, the nonvolatile storage may store data files such as media, software (e.g., for implementing functions on the portable electronic device 16). It should be appreciated that data associated with controlling certain other electronic devices, such as a project file for a control application may be saved in the nonvolatile storage, as discussed further below.

A display 164 displays images and data for the portable electronic device 16. The display 164 may be any suitable display, such as liquid crystal display (LCD), a light emitting diode (LED) based display, or an organic light emitting diode (OLED) based display. The display may function as a touch screen (user interface 165) through which a user may interact with the portable electronic device 16.

The portable electronic device 16 furthers include a user interface 165, such as a graphical user interface (GUI) on the display 164. In practice, the user interface 165 may operate via the CPU, using memory from the main memory and long-term storage in the nonvolatile storage. The user interface may provide interaction with interface elements on the display 164 via certain user input structures, user input peripherals such as a keyboard or mouse, or a touch sensitive implementation of the display 164.

As should be appreciated, one or more applications may be open and accessible to a user via the user interface and displayed on the display of the portable electronic device 16. The applications may run on the CPU in conjunction with the main memory, the nonvolatile storage, the display, and the user interface. As will be discussed below, instructions stored in the main memory, the nonvolatile storage, or the CPU of the portable electronic device 16 may enable a user to control and monitor another electronic device by communicating on a home automation network 12. For example, a user may control many other electronic devices from a single portable electronic device 16, rather than control the other electronic devices individually. As such, it should be appreciated that the instructions for carrying out such techniques on the portable electronic device 16 may represent a standalone application, a function of the operating system of the portable electronic device 16, or a function of the hardware of the CPU, the main memory, the nonvolatile storage, or other hardware of the portable electronic device 16.

One such application that may be open and accessible to the user is a control application for enabling communication on a home automation network 12. For example, the control application may be Mobile Pro® available from Crestron Electronics, Inc. of Rockleigh, N.J. Crestron Mobile Pro® uses mobile broadband or Wi-Fi communication to communicate with a home automation network 12 via a wireless local area network or wide area network. Mobile Pro® allows users to remotely control and monitor devices on the home automation network 12 with a portable electronic device 16. As an example, a user may control and monitor the status of rooms and devices, select media to be played on devices, adjust volume, climate, lighting and security settings of devices on the home automation network 12.

The control application, such as Crestron Mobile Pro® or other similar control application, may be downloaded such as from the Google Play application marketplace or the Apple iTunes marketplace. Upon opening, the control application may communicate with a control network, such as home automation network 12 to download a project file of the control network. The project file provides the instructions allowing the control application to communicate with the target control application. For example, the control application may display one or more menu pages for controlling controllable residential devices on the home automation network 12 according to the project file.

The control application displays a series of menu pages comprising selectable elements and graphical elements. One or more of the selectable elements may correspond to control functions of a keypad or controllable device. The portable electronic device 16 transmits control signals to the home automation network 12 according to the control functions selected by the user. The home automation network 12 may communicate with the portable electronic device 16, such as by providing feedback signals to the portable electronic device 16. In one embodiment, the portable electronic device 16 communicates with a control processor running a logic engine via a gateway. The control processor in turn communicates with the controllable electronic device to execute the control.

In certain embodiments, the portable electronic device 16 may include location sensing circuitry 166. The location sensing circuitry may represent global positioning system (GPS) circuitry, but may also represent one or more algorithms and databases, stored in the nonvolatile storage or main memory and executed by the CPU, which may be used to infer location based on various observed factors. For example, the location sensing circuitry may represent an algorithm and database used to approximate geographic location based on the detection of local 802.11x (Wi-Fi) networks or nearby cellular phone towers. As discussed below, the portable electronic device 16 may employ the location sensing circuitry as a factor for carrying out certain device control techniques. By way of example, the location sensing circuitry may be used by the portable electronic device 16 to determine a users location during an event; the location during the event may cause different information to be displayed on the portable electronic device 16.

The portable electronic device 16 may also include a wired input/output (I/O) interface 167 to permit connection to user input peripheral devices, such as a keyboard or a mouse.

An infrared (IR) interface may enable the portable electronic device 16 to receive and/or transmit signals with infrared light. In this way, the portable electronic device 16 may issue signals to control other electronic devices that may lack other interfaces for communication.

One or more wireless network interfaces 168 provide connectivity for the portable electronic device 16 to the home automation network 12. In certain embodiments, the wireless network interface may include a personal area network (PAN) interface 169, such as for example, a Bluetooth® network, an IEEE 802.15.4 (e.g., ZigBee) network, or an ultra wideband network (UWB). As should be appreciated, the networks accessed by the PAN interface may, but do not necessarily, represent low power, low bandwidth, or close range wireless connections.

In other embodiments, the wireless network interface 168 may include an interface to a wireless local area network (LAN), such as an IEEE 802.11x wireless network. The range of a wireless LAN interface may generally exceed the range available via to PAN interface.

For some embodiments of the portable electronic device 16, the wireless network interface may connect directly to a cellular data network, such as the Enhanced Data rates for GSM Evolution (EDGE) network or other 3G network.

The portable electronic device 16 also includes a near field communication (NFC) interface 172. The NFC interface may allow for extremely close range communication at relatively low data rates (e.g., 464 kb/s), and may comply with such standards as ISO 18092 or ISO 21521, or it may allow for close range communication at relatively high data rates (e.g., 560 Mbps), and may comply with the TransferJet® protocol. The NFC interface may have a range of approximately 2 to 4 cm. The close range communication with the NFC interface may take place via magnetic field induction, allowing the NFC interface to communicate with other NFC interfaces or to retrieve information from tags having radio frequency identification (RFID) circuitry.

The portable electronic device 16 may also include a camera. With the camera, the portable electronic device 16 may obtain digital images or videos.

In certain embodiments of the portable electronic device 16, one or more accelerometers may sense the movement or orientation of the portable electronic device and provide input or feedback regarding the position of the portable electronic device 16 to certain applications running on the CPU.

The home automation network 12 is used for for, among other things, controlling and monitoring various devices and environmental conditions throughout a structure. For example, the home automation network 12 may comprise one or more of the following controllable residential devices 18: audio-video (NV) devices including but not limited to content sources, content sinks, video recorders, audio receivers, speakers, and projectors; lighting devices including but not limited to lamps, ballasts, light emitting diode (LED) drivers; HVAC devices including but not limited to thermostats, occupancy sensors, air conditioning units, heating units, filtration systems, fans, humidifiers; shading elements including but not limited to motorized window treatments, dimmable windows; security elements including but not limited to security cameras, monitors and door locks; household appliances including but not limited to refrigerators, ovens, blenders, microwaves; control devices including but not limited to switches, relays, current limiting devices; and industrial devices including but not limited to motors, pumps, chillers, and air compressors.

The home automation network 12 comprises one or more additional keypads (not shown) for receiving user inputs to control one or more controllable residential devices. Each keypad transmits control signals to home automation network 12 to control an associated controllable residential device. For example, the keypad may communicate with the controllable residential device or with a control processor of the home automation network 12 either directly or via one or more gateways and repeaters.

The keypad may comprise feedback indicators to provide feedback to the user. The feedback may comprise visual feedback and audible feedback. Feedback may be provided by the keypad upon receiving a user input, upon requesting feedback or upon a change in the status of the controllable device.

FIG. 3 is a block diagram of a control processor 22, according to an illustrative embodiment of the invention. The home automation network 12 comprises one or more control processors 22. The control processor 22 is connected to the various controllable residential devices via a wire line or wireless connection. The control processor 22 may be a CP3 control processor available from Crestron Electronics, Inc. of Rockleigh, N.J. The CP3 control processor provides a complete integrated automation solution. The various controllable residential devices of a particular building become integrated and accessible through the control processor.

Control processor 22 is used control various devices, for example, security devices (e.g., door locks), lighting system devices, blinds/drapes, Heating, Ventilating, and Air Conditioning (HVAC) system devices, and sensors such as motion sensors. The one or more control processors 22 may comprise one or more logic engines for processing control signals.

The control processor 22 may include at least one central processing unit (CPU) 221. For example, the CPU 221 may represent one or more microprocessors, and the microprocessors may be "general purpose" microprocessors, a combination of general and special purpose microprocessors, or application specific integrated circuits (ASICs). Additionally or alternatively, the CPU 221 may include one or more reduced instruction set (RISC) processors, video processors, or related chip sets. The CPU 221 may provide processing capability to execute an operating system, run various applications, and/or provide processing for one or more of the techniques described herein. Applications that may run on the control processor 22 may include, for example, a logic engine for processing control signals, software for managing a calendar, and software for controlling other electronic devices via a home automation network 12 as noted above.

A main memory 222 may be communicably coupled to the CPU 221, which may store data and executable code. The main memory 222 may represent volatile memory such as RAM, but may also include nonvolatile memory, such as read-only memory (ROM) or Flash memory. In buffering or caching data related to operations of the CPU 221, the main memory 222 may store data associated with applications running on the control processor 22.

The control processor 22 may also include nonvolatile storage 223. The nonvolatile storage 223 may represent any suitable nonvolatile storage medium, such as a hard disk drive or nonvolatile memory, such as Flash memory. Being well-suited to long-term storage, the nonvolatile storage 223 may store data files, software, and preference information. It should be appreciated that data associated with controlling certain other electronic devices, such as a project file for a control application may be saved in the nonvolatile storage.

One or more network interfaces 225 may provide connectivity for the control processor 22. The network interface 225 may represent, for example, one or more NICs or a network controller. In certain embodiments, the network interface 225 may include a PAN interface 226. The PAN interface 226 may provide capabilities to network with, for example, a Bluetooth® network, an IEEE 802.15.4 (e.g. Zigbee network), or an ultra wideband network. As should be appreciated, the networks accessed by the PAN interface 226 may, but do not necessarily, represent low power, low bandwidth, or close range wireless connections. The PAN interface 226 may permit one electronic device to connect to another local electronic device via an ad-hoc or peer-to-peer connection. However, the connection may be disrupted if the separation between the two electronic devices exceeds the range of the PAN interface 226.

The network interface may also include a local area network (LAN) interface 227. The LAN interface 227 may be a wired Ethernet-based network but may also represent an interface to a wireless LAN, such as an 802.11x wireless network, connected through a router (not shown). The range of a wireless LAN interface may generally exceed the range available via the PAN interface 226. Additionally, in many cases, a connection between two electronic devices via the LAN interface 227 may involve communication through a network router or other intermediary device.

Ethernet connectivity enables integration with IP-controllable devices and allows the control processor 22 to be part of a larger managed control network. Whether residing on a sensitive corporate LAN, a home network, or accessing the Internet through a cable modem, the control processor 22 may provide secure, reliable interconnectivity with IP-enabled devices, such as touch screens, computers, mobile devices, video displays, Blu-ray Disc® players, media servers, security systems, lighting, HVAC, and other equipment—both locally and globally.

The control processor 22 may also include one or more wired input/output (I/O) interface 224 for a wired connection between one electronic device and another electronic device. One or more wired interfaces may represent a serial port, for example a COM port or a USB port. Additionally, the wired I/O interface 224 may represent, for example, a Cresnet port. Cresnet provides a network wiring solution for Crestron keypads, lighting controls, thermostats, and other devices that don't require the higher speed of Ethernet. The Cresnet bus offers wiring and configuration, carrying bidirectional communication and 24 VDC power to each device over a simple 4-conductor cable.

One or more IR interfaces (not shown) may enable the control processor 22 to receive and/or transmit signals with infrared light. The IR interface may comply with an infrared IrDA specification for data transmission. Alternatively, the IR interface may function exclusively to receive control signals or to output control signals. The IR interface may provide a direct connection with one or more devices such as a centralized A/V sources, video displays, and other devices.

One or more programmable relay ports (not shown) may enable the control processor 22 to control window shades, projection screens, lifts, power controllers, and other contact-closure actuated equipment. One or more "Versiport" I/O ports may enable the integration of occupancy sensors, power sensors, door switches, or anything device that provides a dry contact closure, low-voltage logic, or 0-10 Volt DC signal.

For some embodiments of the control processor 22, the network interfaces may include the capability to connect directly to a wide area network (WAN) via a WAN interface 228. The WAN interface 228 may permit connection to a cellular data network, such as the EDGE network or other 3G network. When connected via the WAN interface 228, the control processor 22 may remain connected to the Internet and, in some embodiments, to another electronic device, despite changes in location that might otherwise disrupt connectivity via the PAN interface 226 or the LAN interface 227.

By leveraging remote access of the control processor 22, a user may control the devices or environment settings in a building from anywhere in the world using a portable electronic device 16.

The control system comprises a home automation network 12 which provides access with and between devices of the home automation network 12. The communication network may be a PAN, LAN, metropolitan area network, WAN, an alternate network configuration or some combination of network types and/or topologies. Communication network may include one or more gateway devices (not shown).

The gateways of communication network preferably provide network devices with an entrance to communication network and may include software and/or hardware components to manage traffic entering and exiting communication network and conversion between the communication protocols used by the network devices and communication network. In certain embodiments, the gateways of communication network may function as a proxy server and a firewall server for network devices. Further, the gateways may be associated with a router operable to direct a given packet of data that arrives at a gateway and a switch operable to provide a communication path into and out of each gateway.

In one embodiment, communication network may be a public switched telephone network (PSTN). In alternate embodiments, communication network may include a cable telephony network, an IP (Internet Protocol) telephony network, a wireless network, a hybrid Cable/PSTN network, a hybrid IP/PSTN network, a hybrid wireless/PSTN network or any other suitable communication network or combination of communication networks. In addition, other network embodiments can be deployed with many variations in the number and type of devices, communication networks, the communication protocols, system topologies, and myriad other details without departing from the spirit and scope of the present invention.

FIG. 4 illustrates an exemplary embodiment of a system for controlling one or more lighting loads, according to an illustrative embodiment of the invention. The system 10 comprises a controllable lighting load 27, a lighting dimmer 26, a keypad 14, a smart phone, a home automation network 12 and a control processor 22. It should be noted that the exemplary embodiment of the system illustrated in FIG. 4 may be varied in one or more aspects without departing from the spirit and scope of the teachings disclosed herein.

The keypad 14 receives user inputs for controlling the controllable lighting load in the form of button actuations. In response to the user inputs, the keypad 14 transmits control signals to the control processor 22 via the home automation network 12. Additionally, the keypad may receive feedback from the control processor 22 via the home automation network 12.

The control processor 22 executes the control signal by transmitting a control signal to the lighting dimmer 26. The lighting dimmer 26 limits the amount of electrical power supplied to the lighting load to vary the intensity level of the lighting load according to the control signal. For example, the lighting dimmer 26 may be a phase controlled lighting dimmer 26 such as a triac.

In one embodiment of the invention, the lighting dimmer 26 is integrated with the keypad and the keypad communicates directly with the integrated lighting dimmer 26. In this embodiment, the keypad may transmit status information to the control processor 22.

Refer to FIG. 5 which shows the keypad of FIG. 4 in further detail. In this embodiment the keypad 14 is configured for controlling one or more lights as part of a home automation network 12. For example, the keypad 14 may be a Cameo keypad available from Crestron Electronics, Inc. of Rockleigh, N.J. The keypad 14 comprises a double height "on" button 141A, a "scene 1" button 141B, a "scene 2" button 141C, a "scene 3" button 141D, a split-key raise button 141E and a split-key lower button 141F.

The "on" button switches the one or more controllable lights on and off. For example, the "on" button may toggle one or more lights between full on and full off or it may toggle between the most recent light intensity level and full off. The "scene 1" button, "scene 2" button and "scene 3" button set one or more light intensity levels according to a predefined scene. For example, the "scene 1" button may correspond to a theater setting with overhead lighting being shut off and uplighting being dimmed to a preset level.

The keypad 14 further comprises six LED lights 142A-F for providing visual feedback to the user. One or more visual indicators corresponding to an adjacent button may light when the button is pressed. Additionally, visual indicators may provide feedback as to the lighting level of the one or more lights. Visual indicators may also provide feedback to the user during programming events.

In an embodiment of the invention, the keypad may be configurable to more than one button configuration and button functionality. For example, the keypad shown in FIG. 5 may comprise multiple button configurations of single height, double height, triple height, and split key buttons. As an alternative to the configuration shown in FIG. 5, the keypad may comprise two double height buttons corresponding to an ON button and an OFF button, a single height SCENE button and a row of split key buttons. The button configuration and button functionality may be set by the manufacturer or field configured by an installer. Additionally, the keypad may be available in a variety of colors and labeling styles.

FIG. 6 is a visual representation of an NFC tag, in accordance with an illustrative embodiment of the invention. The keypad 14 further comprises an NFC tag 144. The NFC tag encodes a tag ID 62, such as a network address of the keypad 14, an application identifier 61, a project file ID 63 and a control processor ID 64. The project file ID 63 identifies a project file corresponding to the control system incorporating the NFC tag 144. In certain embodiments, the project file ID may be the same as the control processor ID. The control processor ID or address 64 identifies a control processor 22 corresponding to the control system incorporating the NFC tag 144. In an embodiment of the invention, the NFC tag 144 encodes a button configuration of the keypad 14 and a button functionality of the keypad 14. The NFC tag may encode a button configuration code 65 and a button functionality code 68. The NFC tag 144 may further encode one or more additional physical traits of the keypad 14 such as labels and a keypad color by encoding a label code 67 and a keypad color code 66. In embodiments of the invention, the NFC tag may encode a foreground color and a background color of the keypad button.

The NFC tag is configured for being read by an NFC interface in a passive communication mode. In this mode, the NFC tag draws its operating power from the electromagnetic field provided by the NFC interface of the initiator device. Advantageously, the NFC tag does not require a power supply for operation.

In the embodiment shown in FIG. 5, the NFC tag is disposed on a back surface of a faceplate 143 of the keypad 14. An indicator marking 145 is disposed on the front surface of the faceplate 143 aligned with the NFC tag 144. The indicator marking 145 alerts the user as to the presence and location of an NFC tag 144 on a keypad 14. The indicator marking 145 may be an industry standard mark or a corporate logo or design. It should be noted that the NFC tag 144 need not be disposed on a surface of the keypad 14. For example, the NFC tag 144 may be embedded in the faceplate 143 or be disposed on or embedded in another portion of the keypad 14, such as a housing, or a bezel frame.

In this embodiment, the personal electronic device is a smart phone storing a control application. The control application may be preinstalled or downloaded from an application marketplace such as the Google Play marketplace or the iTunes marketplace.

FIG. 7 is a flowchart showing steps for performing a method of controlling a device, according to an illustrative embodiment of the invention. Referring back to FIG. 4, in step 701, a user positions the portable electronic device 16 such that the NFC interface is in communication range with the NFC tag 144 of the keypad 14. The user may tap a surface of the phone near the NFC tag 144 to the indicator marking 145 of the keypad 14 or position the NFC interface of the portable electronic device 16 to within a range of approximately two to four centimeters of the NFC tag 144.

In step 702, the portable electronic device 16 reads the information encoded on the NFC tag 144 of the keypad 14 such as the tag ID 62, application identifier 61, control processor ID 64 and project file ID 63, over an NFC communication channel 20. In the embodiment described here, the tag ID 62 is a network address of the keypad 14, however, it is not limited to the network address of the keypad. Upon placing the portable electronic device 16 within NFC communication range of the NFC tag 144, the NFC interface of the portable electronic device 16 creates an electromagnetic field, thereby energizing the NFC tag 144. The NFC tag 144 is configured for manipulating the generated electromagnetic field according to the encoded information via load modulation. The NFC interface of the portable electronic device 16 reads the encoded information from the modulated electromagnetic field.

In embodiments of the invention in which the NFC tag 144 encodes information in addition to the network address, the application identifier 61, the project file ID 63 and control processor ID 64, such as the button configuration of the keypad 14, button functionality of the keypad 14 and one or more physical characteristics of the keypad 14, the NFC interface reads this information from the NFC tag 144 as well.

In step 703, the smart phone 16 loads the control application according to the application identifier 61. The application identifier 61 identifies the control application associated with the NFC tag 144. In certain embodiments of the invention, the application identifier 61 is encoded according to operating system requirements. For example, in the Android operating system, each program approved to be offered in the Google Play store requires an application identifier 61. This application identifier 61 is encoded on the NFC tag 144 and understood by the Android operation system. Such control application may be Crestron Mobile Pro® as described above.

In step 704, the control application loads the project file of the home automation network 12 according to the ID of the home automation network 12 received from the NFC tag 144. The project file may be stored locally in the smart phone or may be downloaded from the home automation network 12. As an example, in situations where a user has previously connected to the home automation network 12 via the smart phone, the project file may be stored on the smart phone. In situations where a user has not previously connected to the home automation network 12, a control processor 22 may upload the project file to the smart phone upon receiving the network address of the keypad and identifying information of the portable electronic device 16.

In step 705, upon launching the control application, the control application is configured for automatically transmitting the network address of the keypad 14 as well as a network address of the portable electronic device 16 to the control processor 22 according to the control processor ID encoded on the NFC tag.

In step 706, the home automation network 12 may execute a predefined control upon receiving the network address of the keypad 14 and network address of the portable electronic device 16. In embodiments of the invention, a user may desire to preconfigure the control processor to execute a common control or start-up control. For example, upon receiving the network address of the keypad 14 and network address of the portable electronic device 16 from the portable electronic device 16, the control processor 22 may transmit a control signal to a lighting control to turn on the one or more lights controlled by the wireless keypad 14.

In step 707, the control application displays a menu page of the control application according to the network address received via the NFC tag 144 of the keypad 14. The menu page of the control application comprises one or more selectable visual items corresponding to the one or more control functions of the keypad 14.

In this embodiment, the one or more selectable items are displayed as a graphic facsimile of the keypad 14, thereby providing an intuitive graphic user interface (GUI) for controlling the load. By presenting the keypad graphically as it appears physically, the user intuitively understands how to control the controllable device and does not need to spend time acquainting himself with a graphic interface menu. Advantageously, upon the menu page being a user may quickly glance at his portable electronic device 16 to input commands, just as he would the physical keypad. Accordingly, the control application may provide visual feedback corresponding to the physical keypad. For example, one or more graphical representations of LEDs may flash according to the button icon selected by the user.

FIG. 8 is a schematic of a menu page that may be displayed on the portable electronic device 16 for controlling the controllable residential device 18, according to an illustrative embodiment of the invention. The menu page is displayed as a graphic representation of the keypad 14 including one or more selectable items displayed as buttons of the keypad. The displayed keypad is shown with the same button configuration as the physical keypad 14 and the one or more selectable items are configured to correspond to the same button functionality of the physical keypad 14.

The menu page comprises a graphical "On" button icon 151A, a graphical "Scene 1" button icon 151B, a graphical "Scene 2" button icon 151C, a graphical "Scene 3" button icon 151D, a split key "Lower" button icon 151F and a split key raise button icon 151E. Additionally, the menu page comprises six graphical visual indicators 152A-F corresponding to the six graphical visual indicators 142A-F of the physical keypad 14. The graphic visual indicators may be displayed as lit in accordance with the operation of the physical visual indicators of the physical keypad 14. As an example, the visual indicators may be briefly displayed as lit when a corresponding graphical button is selected much as a physical visual indicator flashes when a corresponding physical button is depressed.

In step 708, the control application receives an input from a user in the form of a selection of one of the selectable items displayed on the portable electronic device 16. For example, the user may select the "Scene 1" item by tapping on the displayed graphic "Scene 1" button. The visual indicator adjacent to the "Scene 1" button may briefly be displayed as lit, mimicking a physical flash of an LED light. Additionally, the control application may display feedback by briefly displaying the "Scene 1" button as depressed.

In step 709, the control application transmits a control signal to the home automation network 12 corresponding to the user input. The home automation network 12 executes the control signal accordingly. Using the example above, the control application may transmit a control signal corresponding to the selected “Scene 1” item to a control processor 22 via the LAN interface of the portable electronic device 16. Accordingly, the control processor 22 may transmit the control signal to the lighting dimmer 26 to dim the controllable lighting load 27 to the predefined level of “Scene 1”.

Additionally, the home automation network 12 may transmit a feedback signal to the portable electronic device 16. As an example, the control processor 22 may transmit the light intensity of the light to the portable electronic device 16. The portable electronic device 16 may then display one or more of the graphic visual indicators as lit according to the feedback signal.

In an embodiment of the invention, the page of the control application may further comprise one or more selectable items providing expanded control options for the keypad. For example, the one or more selectable items may be graphic menu options which provide control options not available on the physical keypad 14. The one or more selectable items may be displayed on the same page as the graphical keypad or as a selectable item providing access to a separate page with the expanded options.

FIG. 9 is a schematic of a screen that may be displayed on the portable electronic device 16 for accessing expanded control options for the controllable residential device 18, according to an illustrative embodiment of the invention. In this embodiment, the control menu provides a selectable icon 153 for accessing a further control menu of expanded control options. Upon selecting the icon 153, the control application may display a control menu with expanded options.

FIG. 10 is a schematic of a screen that may be displayed on the portable electronic device 16 for controlling the controllable residential device 18 with expanded control options, according to an illustrative embodiment of the invention. In this embodiment, the expanded control options include high end trim level 154, low end trim level 155, and delay time 156. In this embodiment, the three expanded control options are displayed as slide controls with a selectable level indicator.

FIG. 11 is a flowchart showing steps for performing a method of controlling a device, according to an illustrative embodiment of the invention. In another embodiment of the invention, upon receiving the network address of the portable electronic device 16 and the keypad 14, the control processor 22 is configured for associating the user with a location of the building in which the NFC tag 144 is located. The control processor 22 may execute actions according to the user and the location. The control processor 22 may control the environment and control settings of the room according to personal preferences of the user. For example, the control processor 22 may control the lights according to user preferences of the user. The settings of preset scenes may be dependent on preferences of the user.

Upon receiving the network address of the keypad 14 and the network address of the portable electronic device 16, a control processor 22 of the home automation network 12 determines whether a personal preference of the user is preconfigured. The personal preference may be preconfigured for the user in general or may correspond to one or more particular rooms. Steps 1101 through 1109, shown in FIG. 11, are analogous to steps 701 through 709 in FIG. 7 and are performed in substantially the same manner.

In step 1101, a user positions the portable electronic device 16 such that the NFC interface is in communication range with the NFC tag 144 of the keypad 14. The user may tap a surface of the phone near the NFC tag 144 to the indicator marking 145 of the keypad 14 or position the NFC interface of the portable electronic device 16 to within a range of approximately two to four centimeters of the NFC tag 144.

In step 1102, the portable electronic device 16 reads the information encoded on the NFC tag 144 of the keypad 14 such as the tag ID 62, application identifier 61, control processor ID 64 and project file ID 63, over an NFC communication channel 20. In the embodiment described here, the tag ID 62 is a network ID of the keypad 14, however, it is not limited to the network ID of the keypad.

In embodiments of the invention in which the NFC tag 144 encodes information in addition to the network address, the application identifier 61, project file ID 63 and the control processor ID 64, such as the button configuration of the keypad 14, button functionality of the keypad and one or more physical characteristics of the keypad, the NFC interface reads this information from the NFC tag 144 as well.

In step 1103, the smart phone 16 loads the control application according to the application identifier 61.

In step 1104, the control application loads the project file of the home automation network 12 according to the ID of the home automation network 12 received from the NFC tag 144.

In step 1105, upon launching the control application, the control application is configured for automatically transmitting the network address of the keypad 14 as well as a network address of the portable electronic device 16 to the control processor 22 according to the control processor ID encoded on the NFC tag.

In step 1106, the automation network 12 may execute a predefined control upon receiving the network address of the keypad 14 and network address of the portable electronic device 16. In embodiments of the invention, a user may desire to preconfigure the control processor to execute a common control or start-up control. For example, upon receiving the network address of the keypad 14 and network address of the portable electronic device 16 from the portable electronic device 16, the control processor 22 may transmit a control signal to a lighting control to turn on the one or more lights controlled by the keypad 14.

In step 1107, the control application displays a menu page of the control application according to the network address received via the NFC tag 144 of the keypad 14. The menu page of the control application comprises one or more selectable visual items corresponding to the one or more control functions of the keypad 14. In this embodiment, the one or more selectable items are displayed as a graphic facsimile of the keypad, thereby providing an intuitive graphic user interface (GUI) for controlling the load. For example, the control application may display the menu page shown in FIG. 8.

In step 1108, the control application receives an input from a user in the form of a selection of one of the selectable items displayed on the portable electronic device 16. For example, the user may select the “Scene 1” item by tapping on the displayed graphic “Scene 1” button. The visual indicator adjacent to the “Scene 1” button may briefly be displayed as lit, mimicking a physical flash of an LED light. Additionally, the control application may display feedback by briefly displaying the “Scene 1” button as depressed.

In step 1109, the control application transmits a control signal to the home automation network 12 corresponding to the user input.

In step 1110, if the personal preference is not preconfigured with the control processor 22, the control processor 22 executes control signals according to a default operation. In step 1111, if the personal preference is preconfigured with the control processor 22, the control processor 22 executes control signals according to the personal preference.

FIG. 12 is a flowchart showing steps for performing a method of controlling a device, according to an illustrative embodiment of the invention. In another embodiment of the invention, the NFC tag encodes information corresponding to the physical characteristics and the button functionality of the keypad 14. This information may be encoded as one or more codes corresponding to the button configuration, keypad color, keypad labels and button functionality of the keypad.

Referring back to FIG. 4, in step 1201, a user positions the portable electronic device 16 such that the NFC interface is in communication range with the NFC tag 144 of the keypad 14. The user may tap a surface of the phone near the NFC tag 144 to the indicator marking 145 of the keypad 14 or position the NFC interface of the portable electronic device 16 to within a range of approximately two to four centimeters of the NFC tag 144.

In step 1202, the portable electronic device 16 reads the information encoded on the NFC tag 144 of the keypad 14 comprising the tag ID 62, application identifier 61, control processor ID 64, project file ID 63, a button configuration code 65, one or more label codes 67, one or more color codes 66 and one or more button functionality codes 68 over an NFC communication channel 20. Upon placing the portable electronic device 16 within NFC communication range of the NFC tag 144, the NFC interface of the portable electronic device 16 creates an electromagnetic field, thereby energizing the NFC tag 144. The NFC tag 144 is configured for manipulating the generated electromagnetic field according to the encoded information via load modulation. The NFC interface of the portable electronic device 16 reads the encoded information from the modulated electromagnetic field.

In step 1203, the smart phone 16 loads the control application according to the application identifier 61. The application identifier 61 identifies the control application associated with the NFC tag 144. In certain embodiments of the invention, the application identifier 61 is encoded according to operating system requirements. For example, in the Android operating system, each program approved to be offered in the Google Play store requires an application identifier 61. This application identifier 61 is encoded on the NFC tag 144 and understood by the Android operation system. Such control application may be Crestron Mobile Pro® as described above.

In step 1204, the control application displays a generated menu page of the control application according to the button configuration code, one or more label codes, the color code and the one or more button functionality codes received via the NFC tag 144 of the keypad 14. The control application may reference the one or more codes in one or more look-up tables and employ a graphics engine to generate a graphic representation, such as a graphic facsimile of the keypad. The generated menu page comprises the graphical facsimile of the keypad.

The graphic representation of the keypad displayed on the generated menu page of the control application is visually similar to the graphic representation of the keypad displayed on the stored menu page of the project file corresponding to the keypad 14, such as shown in FIG. 8. The generated menu page comprises one or more selectable visual items corresponding to the one or more physical buttons of the keypad point 14. The generated menu page is displayed as a graphic representation of the physical keypad 14 including one or more selectable items displayed as buttons of the keypad.

For the embodiment shown in FIG. 8, The NFC tag 144 may comprise a button configuration code corresponding to a 2-1-1-1-split button configuration. The NFC tag may further comprise one or more label codes corresponding to "ON", "Scene 1", "Scene 2", "Scene 3", "Up Arrow icon" and "Down Arrow icon". Additionally, the NFC tag may encode a color code corresponding to white. The graphic engine of the control application employs these codes to generate the graphic representation displayed on the generated menu page.

Advantageously, by generating the image from information encoded on the NFC tag, the control application may display the menu page of the keypad while loading the project file and locating the stored menu page of the project file associated with the keypad, thereby providing the user a quick response time.

The generated menu page may be a temporary placeholder providing a functional interface until the stored menu page may be displayed on the portable electronic device 16. In embodiments of the invention, the generated menu page may not be substituted for a stored menu page.

In step 1205, the control application receives one or more user inputs to the generated menu page. For example, the user may select the one or more selectable visual items by tapping the touchscreen of the portable electronic device 16.

In step 1206, the control application logs user inputs to the generated menu page for execution upon associating it with a keypad of the project file. The control application may log which buttons were selected on the generated menu page and in what order until it can associate the selected buttons with a control function.

In embodiments of the invention in which the NFC tag encodes button functionality of the keypad, as the control application may associate button functionality with button configuration without the project file, the control application may log control functions in response to user inputs to the graphical representation until the control functions can be associated with a keypad address and communicated to the control processor.

In step 1207, the control application loads the project file of the home automation network 12 according to the ID of the home automation network 12 received from the NFC tag 144. The project file may be stored locally in the smart phone or may be downloaded from the home automation network 12.

In step 1208, upon loading the project file, the control application associates the generated menu page with a keypad address and stored menu page and matches logged user inputs with control functions. In embodiments of the invention in which the NFC tag encodes a button functionality of the keypad, the control application may associate logged control functions with a keypad address and stored menu page.

In step 1209, the control application transmits one or more control signals corresponding to the control functions of the logged user inputs to the control processor for execution. The control application transmits the one or more control signals via the network interface of the portable electronic device according to the control processor ID encoded on the NFC tag.

In step 1210, the control application displays the stored menu page of the project file. The graphic representation of the keypad displayed on the stored menu page of the project file is visually indistinguishable from the graphic representation of the keypad displayed on the generated menu page.

FIG. 8 is a schematic of a menu page that may be displayed on the portable electronic device 16 for controlling the controllable residential device 18, according to an illustrative embodiment of the invention. The menu page is displayed as a graphic representation of the physical keypad 14 including one or more selectable items displayed as buttons of the keypad. The keypad is displayed with the same button configuration as the physical keypad 14 and the one or more selectable items are configured to correspond to the same button functionality of the physical keypad 14.

In embodiments of the invention, the control application may not replace the generated menu page with a stored menu page. In these embodiments, the control application may receive inputs to the generated menu page and transmit control commands accordingly.

In step 1211, the control application receives an input from a user in the form of a selection of one of the selectable items displayed on the portable electronic device 16. For example, the user may select the "Scene 1" item by tapping on the displayed graphic "Scene 1" button. The visual indicator adjacent to the "Scene 1" button may briefly be displayed as lit, mimicking a physical flash of an LED light. Additionally, the control application may display feedback by briefly displaying the "Scene 1" button as depressed.

In step 1212, the control application transmits a control signal to the home automation network 12 corresponding to the user input. The home automation network 12 executes the control signal accordingly. Using the example above, the control application may transmit a control signal corresponding to the selected "Scene 1" item to a control processor 22 via the LAN interface of the portable electronic device 16. Accordingly, the control processor 22 may transmit the control signal to the lighting dimmer 26 to dim the controllable lighting load 27 to the predefined level of "Scene 1".

Additionally, the home automation network 12 may transmit a feedback signal to the portable electronic device 16. As an example, the control processor 22 may transmit the light intensity of the light to the portable electronic device 16. The portable electronic device 16 may then display one or more of the graphic visual indicators as lit according to the feedback signal.

INDUSTRIAL APPLICABILITY

To solve the aforementioned problems, the present invention is a unique system in which a portable electronic device 16 communicates with a keypad for controlling a device via NFC to establish remote control of the device over the network.

LIST OF ACRONYMS USED IN THE DETAILED DESCRIPTION OF THE INVENTION

The following is a list of the acronyms used in the specification in alphabetical order.

ASIC application specific integrated circuit
A/V audio visual
COM communication (e.g. COM port)
CPU central processing unit
GUI graphical user interface
LAN local area network
LED light emitting diode
HVAC heating, ventilation, and air conditioning
I/O input/output
ID identification
IP internet protocol
IR infrared
ISO International Standards Organization
LAN local area network
LED light emitting diode
NFC near field communication
PAN personal area network (e.g. Zigbee)
PSTN public switched telephone network
RF radio frequency
RFID radio frequency identification
RISC reduced instruction set
URL uniform resource locator
USB universal serial bus (interface standard)
VDC volts, direct current
WAN wide area network

Alternate Embodiments

Alternate embodiments may be devised without departing from the spirit or the scope of the invention. For example, the NFC tag 144 may encode a uniform resource locator (URL) address directing the portable electronic device 16 to a location for downloading the control application.

In this embodiment, the mobile device loads the control application and automatically transmitting the network address of the keypad and mobile device in response to receiving this information from the NFC tag. However in another embodiment of the invention, the mobile device may receive this information via a RF beacon, such as an RF beacon communicating according to the Bluetooth 4.0 standard.

In this embodiment, a user may position the mobile device within range of one or more RF beacons. For example, the user may have the mobile device located in his pocket while he walks within range of the RF beacon.

What is claimed is:

1. A system for controlling a lighting load on a home automation network, the system comprising:

(a) a keypad configured for receiving user inputs for controlling the lighting load and comprising
  (i) an NFC tag encoding a network address of the keypad and an application identifier, and
  (ii) a button assembly comprising a plurality of buttons having a button configuration defining a number of and arrangements of the plurality of buttons, and a button functionality defining control functions of each of the plurality of buttons, the NFC tag encoding the button configuration and the button functionality of the plurality of buttons; and
(b) a portable electronic device comprising an NFC interface, a wireless network interface, a display, a memory encoding one or more processor-executable instructions and a processor configured to load the one or more processor-executable instructions when encoded from the memory wherein the one or more processor-executable instructions, when executed by the processor, cause acts to be performed comprising:
  (i) reading the network address of the keypad, an application identifier, and the button configuration, and the button functionality encoded on the NFC tag via the NFC interface of the portable electronic device,
  (ii) opening a control application associated with the application identifier configured for communicating with the home automation network,
  (iii) transmitting the network address of the keypad and a user ID associated with the portable electronic device to the home automation network via the wireless network interface, (iv) displaying, on the display based on the button configuration and the button functionality read from the NFC tag, a menu page of the control application comprising a plurality of selectable visual items corresponding to the plurality of buttons of the keypad and having the same configuration and functionality as the plurality of buttons of the keypad, (v) receiving one or more inputs that correspond to actuating one or more of the plurality of buttons of the keypad, and (vi) transmitting a control signal to the home automation network via the wireless network interface in response to a selection of one of the one or more selectable visual items; and (c) wherein the home automation network is configured for executing control signals for the lighting load in accordance with predefined user preferences associated with the user ID.

2. The system of claim 1 wherein the one or more processor-executable instructions, when executed by the processor, cause acts to be performed further comprising displaying on the display one or more selectable visual items representing one or more expanded control options.

3. The system of claim 2 wherein the one or more expanded control options for the lighting load further comprise a high end trim level, a low end trim level and a delay timer for a lighting scene.

4. A system, comprising:

(a) a controllable residential device;

(b) a home automation network;

(c) a keypad configured for receiving user inputs for controlling the controllable residential device, the keypad comprising:

(i) an NFC tag encoding a tag ID, an application identifier, a project file ID, a control processor ID, and information detailing physical characteristics of the keypad, and (ii) a button assembly comprising more a plurality of buttons having a button configuration defining a number of and arrangements of the plurality of buttons, and a button functionality defining a-control functions of each of the plurality of buttons, the NFC tag encoding the button configuration and the button functionality of the plurality of buttons; and (d) a portable electronic device comprising an NFC interface, a wireless network interface, a display, a memory encoding one or more processor-executable instructions, and a processor configured to load the one or more processor-executable instructions when encoded from the memory wherein the one or more processor-executable instructions, when executed by the processor, cause acts to be performed comprising:

(i) reading the tag ID, the application identifier, the project file ID, the control processor ID, the information detailing the physical characteristics of the keypad, and the button configuration, and the button functionality encoded on the NFC tag via the NFC interface of the portable electronic device, (ii) opening a control application associated with the application identifier, the control application configured for communicating on the home automation network, (iii) transmitting the network address of the keypad and a user ID associated with the portable electronic device to the home automation network via the wireless network interface, (iv) generating a graphical facsimile of the keypad based on the information detailing the physical characteristics of the keypad and the button configuration and the button functionality read from the NFC tag, the graphical facsimile of the keypad comprising a plurality of selectable visual items corresponding to the plurality of buttons of the keypad and having the same configuration and functionality as the plurality of buttons of the keypad, (v) displaying, on the display, a generated menu page comprising the graphical facsimile of the keypad, (vi) executing control signals for the controllable residential device in accordance with predefined user preferences associated with the user ID, (vii) receiving one or more inputs to the generated menu page that correspond to actuating one or more of the plurality of buttons of the keypad, (viii) logging the one or more inputs to the generated menu page as logged button actuations, (ix) loading a stored project file of the home automation network corresponding to the project file ID encoded on the NFC tag, (x) associating the one or more logged button actuations with one or more control functions of the keypad, and (xi) transmitting one or more control signals corresponding to the associated control functions via the wireless network interface to a control processor associated with the control processor ID encoded on the NFC tag.

5. The system of claim 4 wherein the one or more processor-executable instructions, when executed by the processor, cause acts to be performed further comprising:

(a) substituting for the generated menu page on the display, a stored menu page of the project file comprising a further plurality of selectable visual items corresponding to the plurality of buttons of the keypad and having the same button configuration and button functionality as the plurality of buttons of the keypad;

(b) receiving one or more inputs to the further plurality of selectable visual items that correspond to actuating one or more of the plurality of buttons of the keypad; and (c) transmitting a control signal to the control processor via the wireless network interface in response to receiving the one or more inputs to the one or more of the further plurality of selectable visual items.

6. The system of claim 4 wherein the one or more physical characteristics comprises a keypad color.

7. The system of claim 4 wherein the one or more physical characteristics comprises one or more keypad labels.

8. The system of claim 1, wherein the button assembly is configurable in alternative button configurations each defining an associated number and arrangement of an associated plurality of buttons, and the NFC tag encodes one or more of the alternative button configurations.

9. The system of claim 8, wherein the displayed menu page of the control application includes a plurality of selectable visual items corresponding to one of the alternative button configurations encoded on the NFC tag and has the same button configuration as that button configuration.

10. The system of claim 1, wherein the button assembly is configurable in alternative button functionalities each defining associated control functions of an associated plurality of buttons, and the NFC tag encodes at least one of the alternative button functionalities.

11. The system of claim 10, wherein the displayed menu page of the control application includes a plurality of selectable visual items corresponding to one of the alternative button configurations encoded on the NFC tag and has the same button functionality as that button configuration.

12. The system of claim 1, wherein the keypad includes a plurality of visual indicators associated with operation of one or more of the plurality of buttons, and the displayed menu page of the control application includes a plurality of graphical visual indicators corresponding to the plurality of visual indicators of the keypad.

13. The system of claim 1, wherein the keypad includes a plurality of visual indicators associated with controlling a lighting load, and the displayed menu page of the control application includes a plurality of graphical visual indicators corresponding to the plurality of visual indicators of the keypad.

14. The system of claim 4, wherein the button assembly is configurable in alternative button configurations each defining an associated number and arrangement of an associated plurality of buttons, and the NFC tag encodes one or more of the alternative button configurations.

15. The system of claim 14, wherein the displayed menu page of the control application includes a plurality of selectable visual items corresponding to one of the alternative button configurations encoded on the NFC tag and has the same button configuration as that button configuration.

16. The system of claim 4, wherein the button assembly is configurable in alternative button functionalities each defining associated control functions of an associated plurality of buttons, and the NFC tag encodes at least one of the alternative button functionalities.

17. The system of claim 16, wherein the displayed menu page of the control application includes a plurality of selectable visual items corresponding to one of the alternative button configurations encoded on the NFC tag and has the same button functionality as that button configuration.

18. The system of claim 4, wherein the keypad includes a plurality of visual indicators associated with operation of one or more of the plurality of buttons, and the displayed menu page of the control application includes a plurality of graphical visual indicators corresponding to the plurality of visual indicators of the keypad.

19. The system of claim 4, wherein the keypad includes a plurality of visual indicators associated with controlling the controllable residential device, and the displayed menu page of the control application includes a plurality of graphical visual indicators corresponding to the plurality of visual indicators of the keypad.

* * * * *